United States Patent [19]
Schehrer

[11] Patent Number: 5,477,354
[45] Date of Patent: Dec. 19, 1995

[54] FERROELECTRIC LIQUID CRYSTAL PHASE-ONLY MODULATOR WITH ONE FERROELECTRIC LIQUID CRYSTAL SPATIAL LIGHT MODULATOR'S SMECTIC LAYERS ORTHOGONAL TO ANOTHER'S

[75] Inventor: Kevin L. Schehrer, Calabasas Hills, Calif.

[73] Assignee: Rockwell International Corporation, Seal Beach, Calif.

[21] Appl. No.: 343,143

[22] Filed: Nov. 21, 1994

[51] Int. Cl.$^6$ .............................. G02F 1/133; G02F 1/13
[52] U.S. Cl. ................................................ 359/53; 359/100
[58] Field of Search ................................. 359/53, 93, 73, 359/104, 100

[56] References Cited

U.S. PATENT DOCUMENTS

| | | | |
|---|---|---|---|
| 5,015,074 | 5/1991 | Clerc et al. | 359/53 |
| 5,182,665 | 1/1993 | O'Callaghan et al. | 359/73 |
| 5,347,378 | 9/1994 | Handschy et al. | 359/53 |
| 5,381,253 | 1/1995 | Sharp et al. | 359/053 |

FOREIGN PATENT DOCUMENTS 4-024613  1/1992  Japan ...................... 359/073
4-122913  4/1992  Japan ...................... 359/100

OTHER PUBLICATIONS

A. Sneh, J. Liu, & K. M. Johnson, "High–speed analog refractive–index modulator that uses a chiral smectic liquid crystal," pp. 305–307, Optics Letters, Feb. 15, 1994 vol. 19, No. 4.

G. D. Love, J. V. Major, & A. Purvis, "Liquid–crystal prisms for tip–tilt adaptive optics," pp. 1170–1172, Optics Letters, Aug. 1, 1994, vol. 19, No. 15.

Primary Examiner—Anita Pellman Gross
Assistant Examiner—Walter J. Malinowski
Attorney, Agent, or Firm—George A. Montanye; Harry B. Field; Steven E. Kahm

[57] ABSTRACT

A phase only spatial light modulating device for variably changing the phase of light passing through the device without changing the polarization of the light. Two analog state ferroelectric liquid crystal phase only spatial light modulators are placed such that their smectic layers are orthogonal to each other. The angle of the molecules in the two modulators is controlled to be at the same angle. Whereby light passing through both of the modulators obtains a phase delay for arbitrary polarized input light without amplitude modulation or change in polarization state.

3 Claims, 2 Drawing Sheets

FERROELECTRIC LIQUID CRYSTAL PHASE-ONLY MODULATOR WITH ONE FERROELECTRIC LIQUID CRYSTAL SPATIAL LIGHT MODULATOR'S SMECTIC LAYERS ORTHOGONAL TO ANOTHER'S

BACKGROUND OF THE INVENTION

1. Field of the Invention

A phase changing device for light using a ferroelectric liquid crystal (FLC) spatial light modulator (SLM).

2. Description of the Related Art

There are many devices currently used to modulate the two-dimensional phase distributions to a beam of light image. SLMs are especially suitable for optical signal processing applications, and there are many SLMs that can alter the two-dimensional phase distribution of a light beam. However, many of these devices also alter either the amplitude or the polarization of the beam as well. Those that, in certain implementations, can preserve the polarization and amplitude are typically slow; e.g., 1/100 seconds frame speed for parallel aligned nematic liquid crystal.

For correcting aberrated images and for propagation of light beams through aberrating media, deformable mirrors and segmented mirrors have been used to modulate the two-dimensional phase distribution. Both are expensive, complicated, heavy, and slow because they require mechanical actuators. Mechanical means are more subject to failure and thus less reliable. SLMs can also be used to correct for aberrations but their speed limits the bandwidth of the aberrations that they can correct for.

Presently, surface stabilized FLC SLMs are used in a binary mode but have rapid response times of less than 100 microseconds. Even in the binary mode, they typically alter amplitude and/or polarization as well as phase. Some devices have been constructed that use FLC in such a way as to get an analog response. However, these devices use FLC in ways that require processing that is considerably less developed than surface stabilization.

SUMMARY OF THE INVENTION

By use of this invention, FLC-SLMs can be used to change the phase of light without changing its polarization or amplitude. FLC-SLMs are faster, smaller, lighter, more reliable, and less expensive than mechanical phase change devices.

In the past, FLC-SLMs were surface stabilized and binary. In contrast, the present invention uses analog surface stabilized FLC. Partially rotated FLC molecules are used to adjust the phase change of the light passing through the FLC-SLM to the desired magnitude.

In the past, SLMs were either slower or not inherently compatible with very large scale integrated (VLSI) circuits, in contrast to the FLC-SLMs presented here.

The present invention comprises two FLC-SLMs having smectic layers perpendicular to each other. The FLC-SLMs are divided into pixels. The molecules in the corresponding pixels of the two FLCs are rotated about the smectic layer normal the same angle so that the polarization of the incident light is preserved. The light incident on a pixel of the first FLC-SLM can be decomposed into two orthogonal polarization components. The first component is parallel to the ordinary axis of the index ellipsoid associated with the FLC molecules comprising the pixel. The second component is parallel to the extraordinary axis. The second component thereby acquires a phase shift with respect to the first component. A second FLC-SLM has pixels that correspond to those in the first. Corresponding pixels in the first and second FLC-SLMs are in the same analog adjusted state but have orthogonal smectic layers. Thus, the first polarization component is extraordinary with respect to the second FLC-SLM, and the second component is ordinary. In passing through the two FLC-SLMs, both polarizations acquire the same phase shift corresponding to the projection of the extraordinary index ellipsoid onto a plane orthogonal to the direction of light propagation. Such projection depending on the analog adjusted state of smectic layers in the pixels. Therefore, light passing through the device obtains a desired phase delay for any arbitrarily polarized input light without amplitude modulation or change in polarization state.

OBJECTS

It is an object of this invention to provide a fast response phase modulation to light beams.

It is also an object of the invention to provide a higher space-bandwidth product phase change correction.

It is a further object to provide a light weight phase modulation device.

It is still a further object of the invention to provide a lower cost means of modulating phase changes of light beams. Another object of the invention is to eliminate mechanical elements which reduce reliability of the phase change device.

It is yet another object of the invention to obtain pure phase modulation without any amplitude modulation.

It is also an object of the invention to obtain a pure phase modulation regardless of input polarization.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
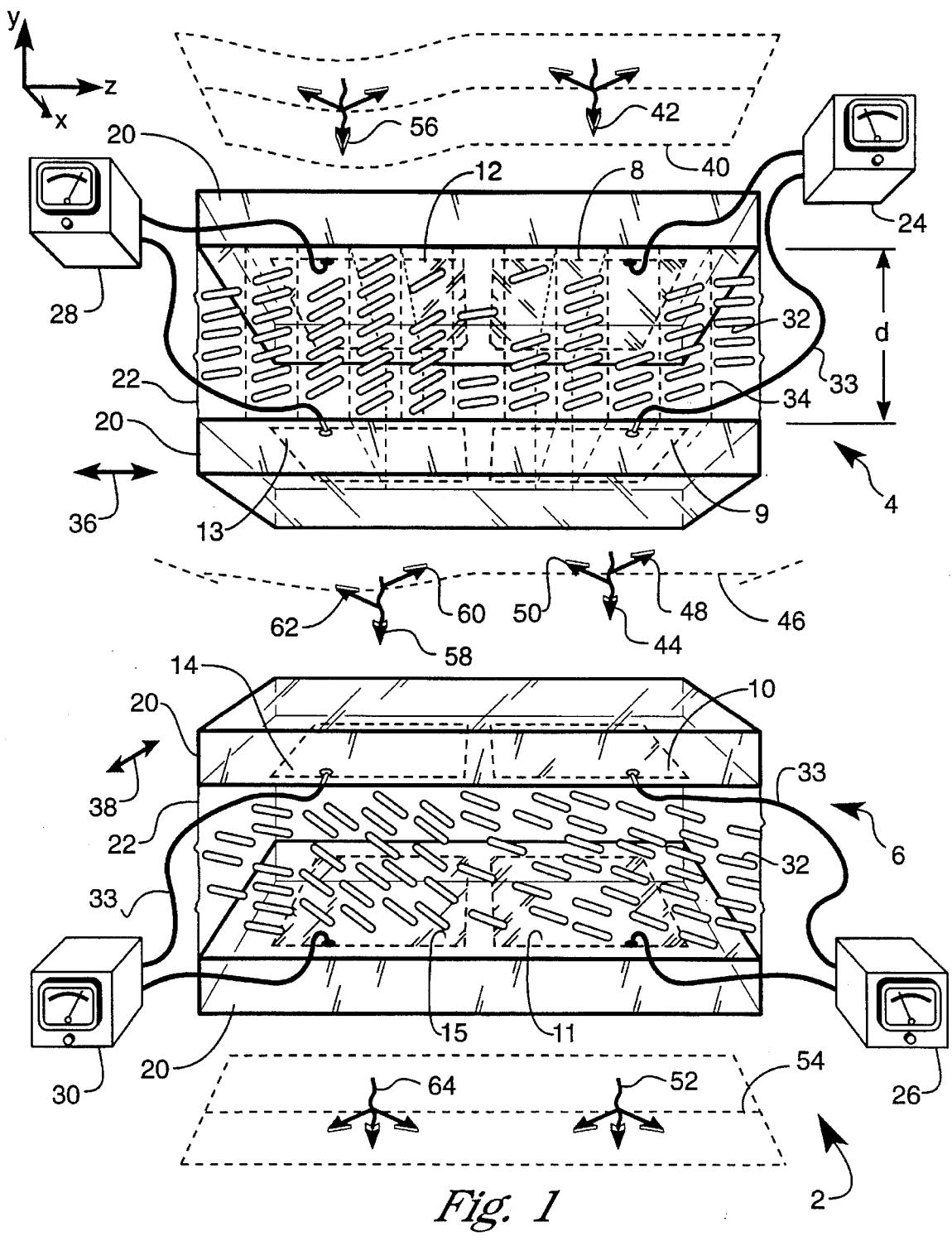
FIG. 1 shows two light rays passing through two differently activated pixels of a different gray scale in a polarization independent phase-only (PIPO) FLC-SLM.

FIG. 1 illustrates a particular PIPO-FLC-SLM generally designated 2. For simplicity, linearly polarized light is considered as input to the PIPO-FLC-SLM in the figures. However, the PIPO-FLC-SLM can be used with light sources having any polarization. The device does not change the polarization state of an arbitrary input polarization state, including unpolarized light. The invention will work with light which is not coherent, across a narrow wave band with light of any phase.

The PIPO-FLC-SLM 2 comprises an upper analog FLC-SLM 4 and a similar lower one 6. The upper and lower FLC-SLM's have smectic layers that are oriented perpendicular to each other. Each FLC-SLM has pixels defined by transparent electrodes 8–15 supported by transparent substrates 20. For simplicity in the explanation, this PIPO-FLC- SLM has only two pixels; although, in general, there would be many more. Between substrates 20 is ferroelectric smectic liquid crystal 22, which is activated as pixels (picture elements) when the electrodes are electrically charged in pairs 8–9, 10–11, 12–13, and 14–15 by controllers 24, 26, 28, and 30, respectively, connected thereto by wires 33. While the connections here are shown schematically as wires 33, more typically, connections might include lines of conductor on the substrates 20. Pixels may also be reflectively coated portions of a larger VLSI circuit having many replicas of underlying circuitry. Liquid crystal 22, being smectic, is composed of rod-like molecules 32 which spontaneously arrange in layers. Layer boundaries are indicated by dashed lines 34 (omitted in SLM 6 for clarity). Molecules 32, a few of which are shown larger than practice for clarity, spontaneously align in directions 36, 38 due to alignment layers on transparent substrates 20. After spontaneous alignment, molecules 32 may be angularly displaced by application of predetermined quantity of change to transparent electrodes. Angular disposition illustrated in FIG. 1 obtains when controllers 24, 26 supply less energetic excitation to electrode pairs 8–9, 10–11 than that supplied by controllers 28, 30 to electrode pairs 12–13, 14–15. Therefore, the angular disposition of liquid crystal molecules is electrically controllable, thereby enabling electrical control of the extent of interaction between molecules and light propagated therethrough. In the example shown in FIG. 1 the electric charges 28 and 30 on the pixel pair for light rays 56 and 58 are equal, so as to align the molecules 32 by the same degree of angular rotation for the FLC-SLM's 4 and 6. Similarly each pixel pair in the PIPO-FLC-SLM 2 has the same charge and rotation of the molecules 32 to individually control the local light rays.

Exemplary linearly polarized light impinging the apparatus from the y direction is indicated by isophasic surface 40, which surface differs from planar because portions of light differ in phase, therefore differ in propagatory time delay graphically portrayed by differential distances from the x-z plane. In this example, impinging light 42 lags impinging light 56.

Light impinging the liquid crystal 22 may be represented by an ordinary and extraordinary component. Exemplary impinging linearly polarized light rays 42, 56 indicate these components by arrows perpendicular to the y axis. After light 42 passes through SLM 4 by way of the upper pixel bounded by transparent electrodes 8 and 9, interaction with angularly disposed molecules results in light 44 which is elliptically polarized, with ordinary component 48 delayed relative to extraordinary component 50 at isophasic surface 46. Light 44 interacts with the portion of liquid crystal 22 of SLM 6 between electrodes 10, 11, resulting in emerging light 52 at isophasic surface 54. The optical action of SLM 6 is disposed to that of SLM 4 by an angle predetermined to delay extraordinary component 50 by the same time as the delay of ordinary component 48 in SLM 4 and thereby return light 52 to the same state of polarization as incident light 42, in this case, linearly polarized. After linearly polarized light 56 passes through SLM 4 by way of the pixel bounded by transparent electrodes 12, 13, interaction with angularly disposed molecules results in light 58 which is elliptically polarized, with ordinary component 60 delayed relative to extraordinary component 62 at isophasic surface 46. Light 58 interacts with liquid crystal of SLM 6 bounded by electrodes 14, 15, resulting in emerging light 64 at isophasic surface 54. The optical action of SLM 6 is disposed to that of SLM 4 an angle predetermined to delay extraordinary component 62 by the same time as the delay of ordinary component 60 in SLM 4, thereby returning light 64 to the same state of polarization as incident light 56, in this case, to linearly polarized. However, molecules between electrodes 12–13, 14–15 are rotated by a greater angle than molecules of the adjacent pixel, and therefore emerging light ray 64 is delayed by a greater time than emerging light ray 52. In the illustrated example, the excitation levels of controllers 24, 26, 28, and 30 are adjusted to values prescribed to change curved isophasic surface 40 to a planar surface 54, while restoring the state of polarization of emerging light to that of the state of the incident light, regardless of the initial polarization state thereof. Therefore, incident light rays 42, 56 and emerging light rays 52, 64 have the same states of polarization (linear in this example), and light ray 64 has been delayed in time to arrive at plane 54 at the same instant as light ray 52. Light rays 42 and 56, transformed by the apparatus, emerge as light rays 52 and 64 in a manner similar to light passing through a nonbirefringent layer of the same thickness and refractive index $n_e(\phi)$.

Another adjustment of controllers 24, 26, 28, and 30 may transform planar incident light to a curved isophasic surface, resulting in a predistortion useful in propagating light through a perturbing medium so as to arrive at a predetermined location in a desired phase state (unpredistorted).

Embodiments having FLC-SLMs 4 and 6 with the same responsivity may use half the number of controller channels shown by connecting corresponding first and second pixel electrodes in electrical parallel.

In FIG. 1 the FLC-SLMs 4 and 6 have smectic layers perpendicular to each other and the same charge placed on the electrodes for each pixel to effect the same angular change in the molecules 32 of the smectic layers for a uniform change in the ordinary and extraordinary axis of the light passing through the pixel pairs.

Although separate transparent substrates 20 are shown for clarity, the apparatus may be assembled with two inner substrates made as a single substrate having transparent electrodes applied to both broad surfaces.

Analog SLMs that use surface stabilized FLC are obtainable from Displaytech, Inc., Boulder, Colo., and can be driven to static analog scale.

Figure 2:
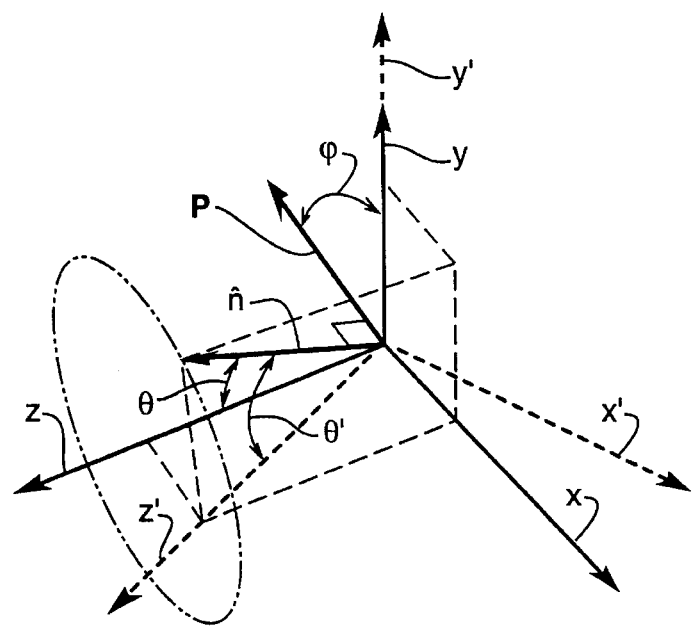
FIG. 2 illustrates the coordinate system used to describe the orientation of an individual FLC molecule.

FIG. 2 illustrates the coordinate system used to describe the orientation of an individual FLC molecule. The molecule director is denoted by n̂, which is perpendicular to the permanent electric dipole moment P. The driving controller of a pixel rotates the permanent electric dipole moment P about the smectic layer normal z by an angle $\phi$. The molecular director n̂ maintains an angle $\theta$ with respect to z; thus, the molecular director n̂ rotates on a cone about the z axis.

Figure 3:
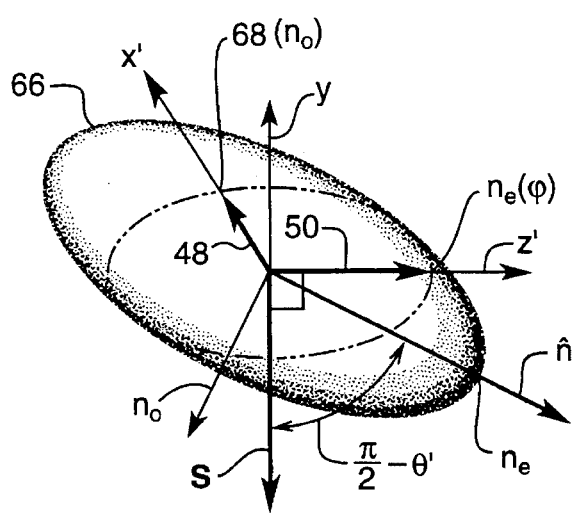
FIG. 3 illustrates that each FLC module can be associated with a uniaxial index ellipsoid.

As illustrated in FIG. 3, each SLM can be associated with a uniaxial index ellipsoid 66. Light having Poynting vector S at an angle $(\pi/2-\theta')$ (note that light normal to an SLM propagates in the negative y direction) with respect to the molecular director n̂, if linearly polarized, can have its polarization decomposed into two orthogonal polarization components, ordinary 48 and extraordinary 50 that, for an FLC state given by $\phi$ (see FIG. 2) are respectively parallel to z' and x'. The ordinary polarization component 48 experiences a refractive index $n_o$ designated 68, while the extraordinary component experiences a refractive index $n_e(\phi)$, which is given by $$\frac{1}{n_e^2(\phi)} = \frac{\sin^2(\theta')}{n_0^2} + \frac{\cos^2(\theta')}{n_e^2}$$

Where, using the coordinates of FIG. 2, $\theta'$ and $\phi$ are related by $$\sin(\theta') = \sin(\theta)\sin(\theta)\sin(\phi)$$

In surface-stabilized FLC, the molecular directors $\hat{n}$ of all molecules are parallel in the smectic layers 22 in a pixel. For an FLC layer of thickness d (FIG. 1), light passing through has its phase shifted by $$\delta\xi_{e1} = 2\pi d n_e(\phi_1)$$

$$\delta\xi_{o1} = 2\pi d n_o$$

for the extraordinary and ordinary components, respectively. The light 44, 58 that has passed through the first SLM 4 is elliptically polarized. In the second SLM 6, the pixels through which the light pass are in the same state $\phi_2$ as in the corresponding pixels in the first SLM ($\phi_2 = \phi_1$). Consequently, the polarization component that was ordinary with respect to the first SLM 4 is extraordinary relative to the second SLM 6, and the component that was extraordinary relative to the first SLM 4 is ordinary relative to the second SLM 6. Then, using $\phi_2 = \phi_1$, the overall phase shift after passing through both SLMs 4, 6 is $$\delta\xi_{e1,2} = \delta\xi_{o1,2} = 2\pi d\ (n_e[\phi_1] = n_o)$$

regardless of polarization of the input.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A phase only spatial light modulating device comprising, a first analog ferroelectric liquid crystal spatial light modulator having a surface stabilized ferroelectric liquid crystal with smectic layers, a second analog ferroelectric liquid crystal spatial light modulator having a surface stabilized ferroelectric liquid crystal with smectic layers, wherein the smectic layers are orthogonal to the smectic layers in the first analog ferroelectric liquid crystal spatial light modulator, wherein light passing through both of the analog ferroelectric liquid crystal spatial light modulators obtains a phase delay for arbitrary polarized input light without amplitude modulation or change in polarization state.

2. A phase only spatial light modulating device as in claim 1 wherein, the spatial light modulators are composed of pixels and the corresponding pixels in the first and second analog ferroelectric liquid crystals are in the same angular state so that the light entering both the pixels does not experience a polarization change.

3. A phase only spatial light modulating device as in claim 1 wherein, the first and second analog ferroelectric liquid crystal spatial light modulators have a substrate bounding the ferroelectric liquid crystal and share a common substrate between the first and second analog ferroelectric liquid crystal spatial light modulators.

\* \* \* \* \*